US005927564A

United States Patent [19]

Simonazzi

[11] Patent Number: 5,927,564

[45] Date of Patent: Jul. 27, 1999

[54] APPARATUS TO PRE-SET AND REGULATE FROM THE OUTSIDE THE CAPACITY OF THE VOLUMETRIC CHAMBER OF METERING FILLING DEVICES OF A BOTTLER

[75] Inventor: Olivia Simonazzi, Parma, Italy

[73] Assignee: Alsim SRL, Italy

[21] Appl. No.: 08/836,327

[22] PCT Filed: Mar. 23, 1995

[86] PCT No.: PCT/IB95/00199

§ 371 Date: Jun. 16, 1997

§ 102(e) Date: Jun. 16, 1997

[87] PCT Pub. No.: WO96/15979

PCT Pub. Date: May 30, 1996

[30] Foreign Application Priority Data

Nov. 18, 1994 [IT] Italy ................................ BO94A0515

[51] Int. Cl.$^{6}$ ...................................................... G01F 11/28

[52] U.S. Cl. ..................... 222/434; 222/444; 141/DIG. 1

[58] Field of Search .................................... 222/434, 438, 222/439, 444, 450; 141/DIG. 1

[56] References Cited

U.S. PATENT DOCUMENTS

| | | | |
|---|---|---|---|
| 2,074,041 | 3/1937 | Baldwin | 222/444 |
| 3,189,233 | 6/1965 | Wilson et al. | 222/440 |
| 4,405,061 | 9/1983 | Bergandy | 222/444 |
| 4,958,665 | 9/1990 | Iwano | 141/DIG. 1 |

FOREIGN PATENT DOCUMENTS

| | | |
|---|---|---|
| 0106971 | 8/1983 | European Pat. Off. . |
| 0262258 | 10/1986 | European Pat. Off. . |
| 0470398 | 7/1991 | European Pat. Off. . |

*Primary Examiner*—Philippe Derakshani
*Attorney, Agent, or Firm*—Brown, Martin, Haller & McClain, LLP

[57] ABSTRACT

Apparatus to pre-set and regulate from the outside the volumetric capacity of the metering cylinders of a filler, equipped with a metering free-hanging device without venting tube and equipped with a set of incorporated permanent magnets, the axial positioning of which, inside the volumetric chamber of the metering cylinder, is pre-set and regulated without contact by the axial excursions actuated by a corresponding set of permanent magnets incorporated in a cursor sliding from the outside of the metering cylinder. The apparatus is without O-rings and during its sanitation the cleaning liquid does not flow through critical interstices.

6 Claims, 10 Drawing Sheets

APPARATUS TO PRE-SET AND REGULATE FROM THE OUTSIDE THE CAPACITY OF THE VOLUMETRIC CHAMBER OF METERING FILLING DEVICES OF A BOTTLER

FIELD OF THE ART

The invention refers to the technological field of bottling, generally known in the international classification B67c, and in particular to the volumetric filling devices.

STATE OF THE ART

In the literature of prior art are described several types of metering devices (for example patent EP A1 0262258) in which the volumetric chamber includes a mobile cover, sliding inside the transfer chamber, and equipped with o-ring seals.

In the patent EP A1 0470398 is shown a piston inside a metering chamber, and the movements of which, are controlled by an actuating rod, exiting from the chamber, equipped with o-ring seals.

Furthermore, in all known systems, the capacity of the volumetric chamber of the metering filling devices, is preset and regulated, by movements of a piston inside the volumetric chamber. Said movements are actuated by rods that exit to be connected to the cinematic systems. Such rods need to be equipped with o-ring seals at the exit orifice. These o-rings are known to cause problems during the sanitation and cleaning in place.

The problem yet to be solved is the realization of a device to actuate the movements of a sliding body inside the volumetric chamber without employing mechanical devices going through the hermetic cover of said filling chamber.

This problem is solved by the present invention as defined in the appended claims. The solution proposed, is to employ a system with permanent magnets, which allows to move from the outside a body suspended inside the hermetic chamber.

The forces needed to move the inside body can be transferred without contact, using the magnetic fields through the walls of the volumetric chamber.

Furthermore, the running slack fit of the inside body, is utilized to allow the flow of the processing fluids without the use of the traditional venting tube.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which.

DESCRIPTION OF THE PREFERRED EMBODIMENT

Figure 1:
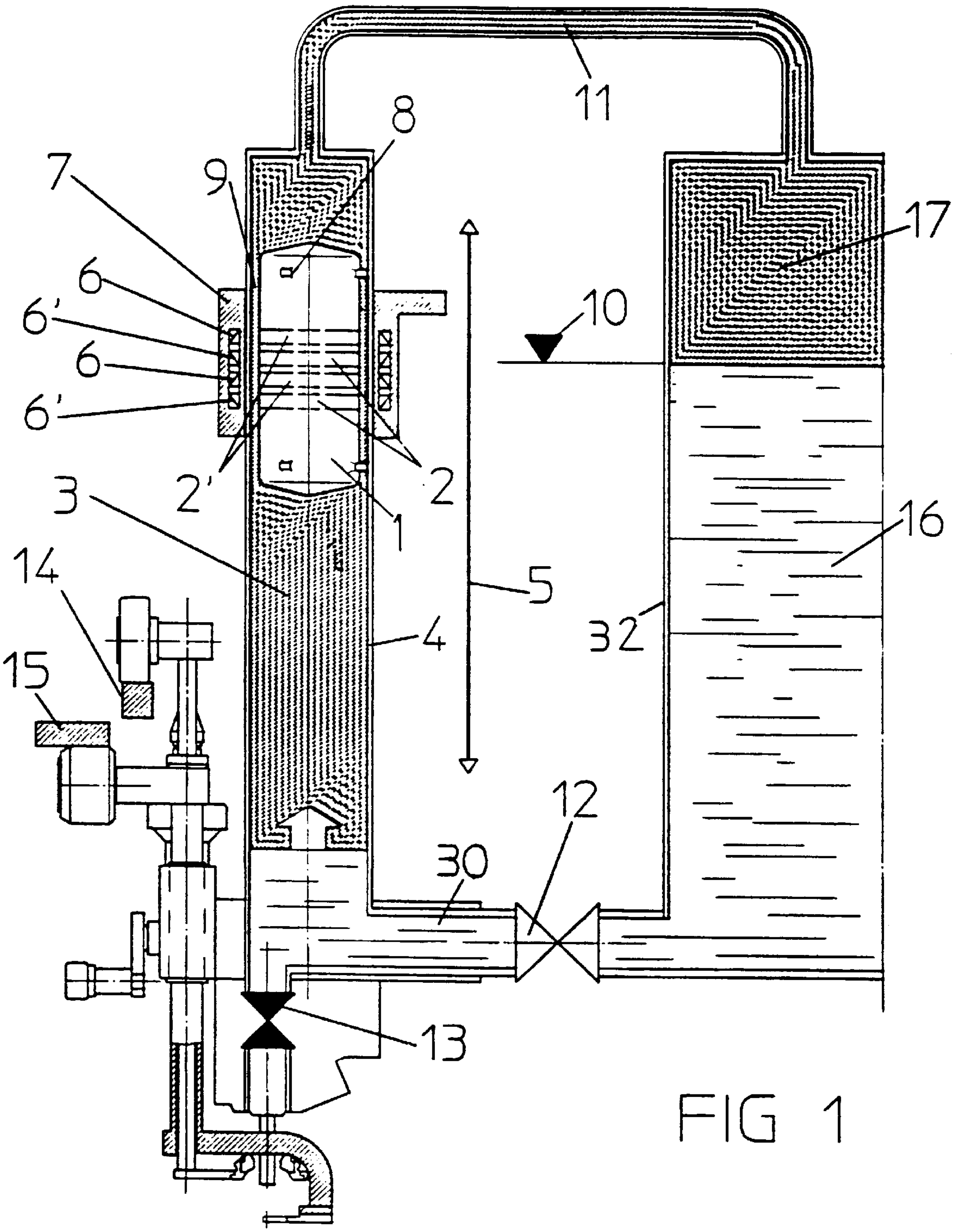
FIG. 1 is a partial cross-sectional view of a metering apparatus according to a preferred embodiment of the invention, showing the start of a transfer phase of the filling liquid from a main feeding tank into a volumetric chamber.

FIGS. 1 to 7 illustrate a metering apparatus according to a preferred embodiment of the present invention for supplying predetermined quantities of a liquid 16 to a bottle or other container, and also illustrate successive steps in a filling operation. The metering apparatus basically comprises a vertically orientated metering cylinder 4 having an inner wall defining a volumetric chamber 3, and a free-hanging metering device 1 slidably mounted in chamber 3 for controlling the amount of liquid supplied to chamber 3, as described in more detail below.

The lower end of the chamber 3 is connected via passageway 30 to the lower end of a main filling tank 32, and a cut-off valve 12 is provided in passageway 30. The upper end of the chamber 3 is connected via connecting pipe 11 to the upper end of main filling tank 32. As illustrated in the drawings, a gas phase 17 such as carbon dioxide is provided above the liquid level 10 in tank 32, and pipe 11 provides communication of the gas phase into the upper portion of chamber 3. A filling outlet is provided at the lower end of chamber 3 to supply liquid to a bottle placed at the outlet as in FIGS. 5 to 7, and filling valve 13 controls the supply of liquid from the outlet.

Figure 2:
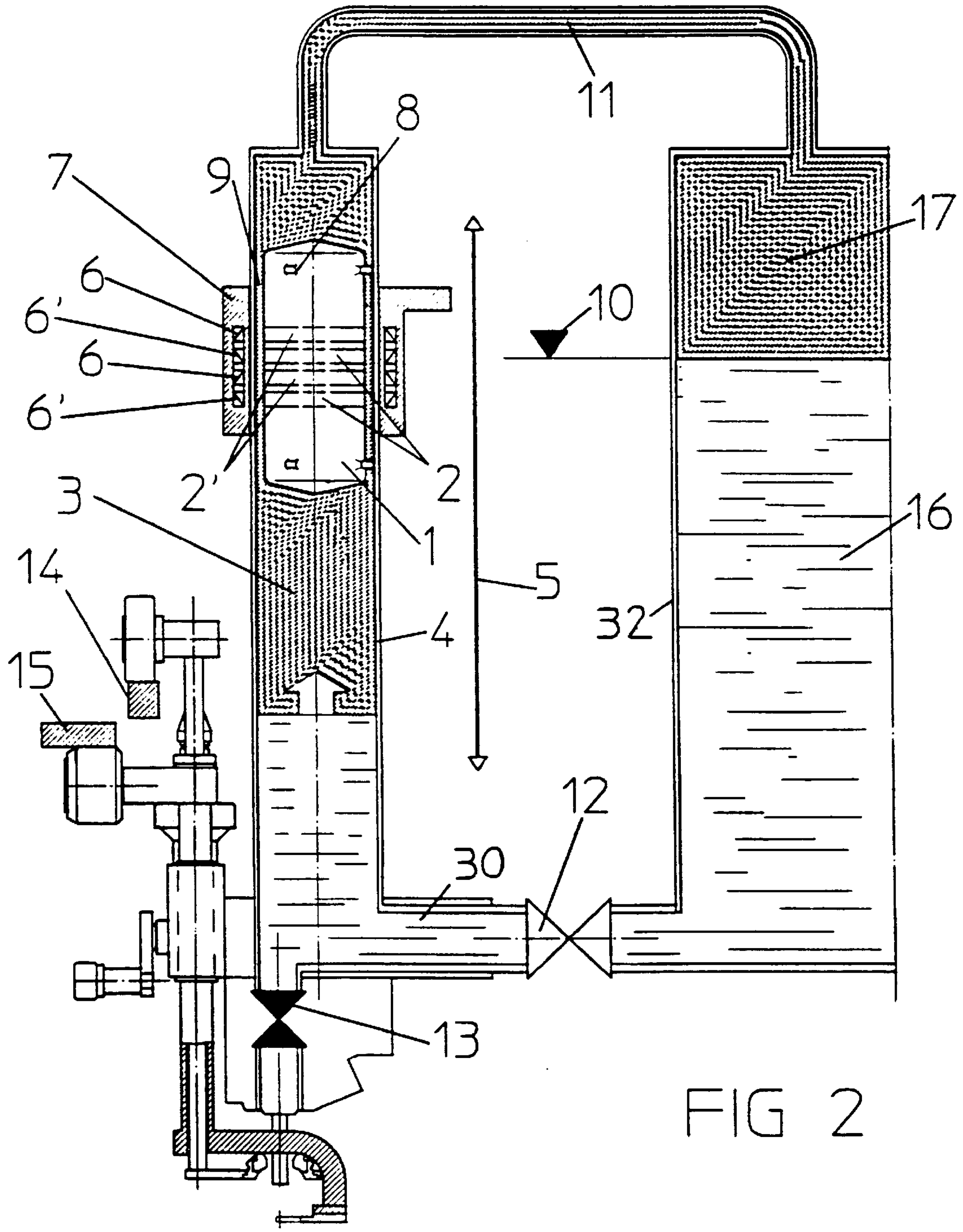
FIGS. 2 and 3 are views similar to FIG. 1 showing the continuing flow of liquid during the transfer phase.
Figure 3:
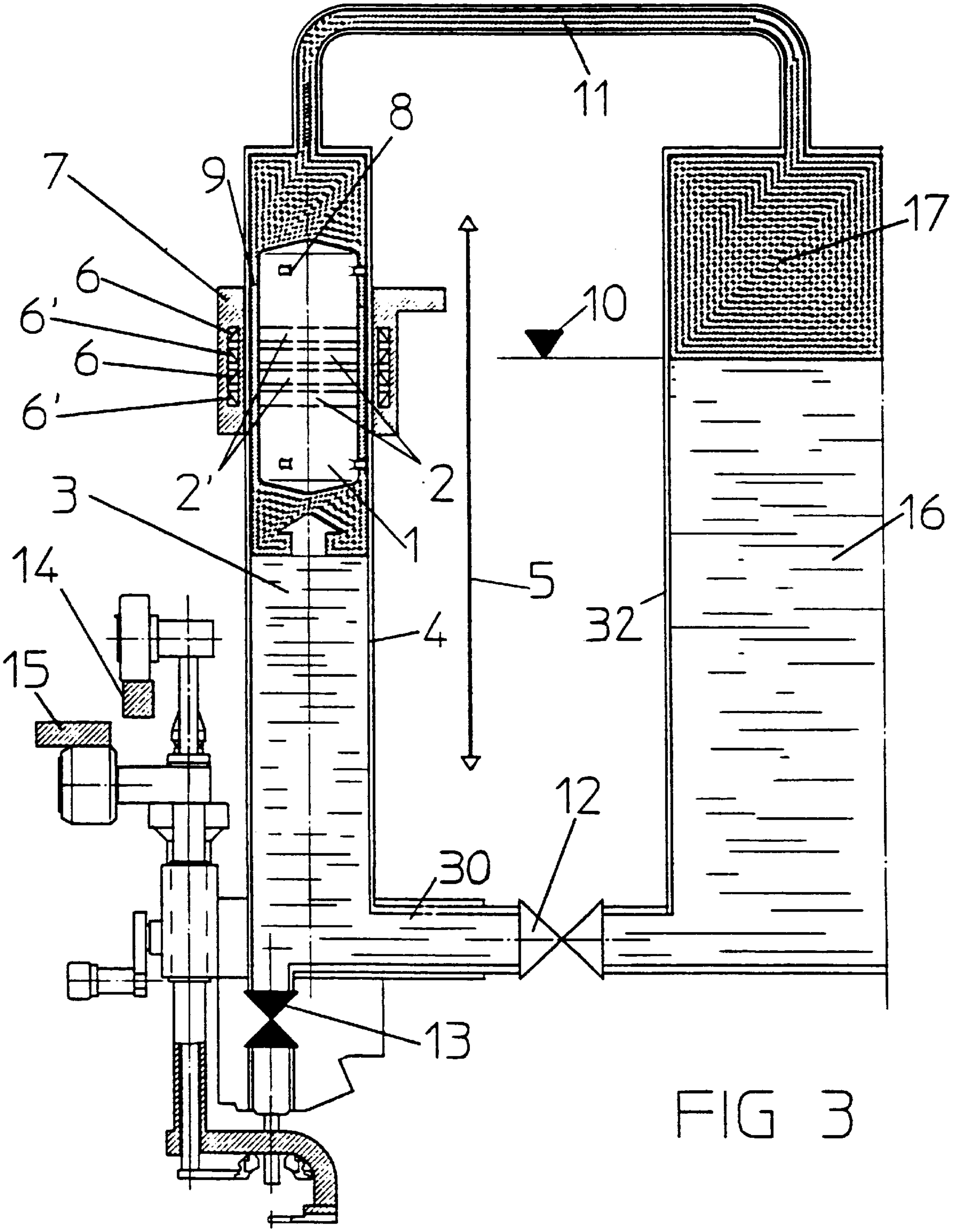

The metering device 1 is generally cylindrical in shape and has a plurality of outwardly projecting centering shoes 8 which guide the device 1 for axial sliding movement in the chamber 3. As illustrated in FIGS. 1 to 3, a plurality of magnetic rings 2, 2' are incorporated in device 1, with rings 2 being north and rings 2' being south. An annular cursor device 7 is slidably mounted on the outside of cylinder 4. Magnetic rings 6, 6' are incorporated in cursor device 7 as indicated in FIGS. 1 and 2, with rings 6 being north and rings 6' being south. As illustrated in FIG. 1, when the cursor device is positioned with magnets 6 aligned with magnets 2' of the metering device 1, and magnets 6' aligned with magnets 2 of device 1, the magnets will attract each other such that the device 1 will be held in the illustrated position by the cursor device, and will move up and down with the cursor device as the cursor device is moved axially along the outside of cylinder 4.

FIG. 1 shows the starting of the transfer phase of the processing fluids (16). The fluids coming from the main feeding tank pass through the open valve (12), and from underneath enter into the volumetric chamber (3). It is also shown the gas (17) inside the main tank and inside the volumetric chamber.

FIG. 2 and FIG. 3 show the continuing flow of the transfer phase and evidentiate the higher level of the liquid inside the volumetric chamber.

Figure 4:
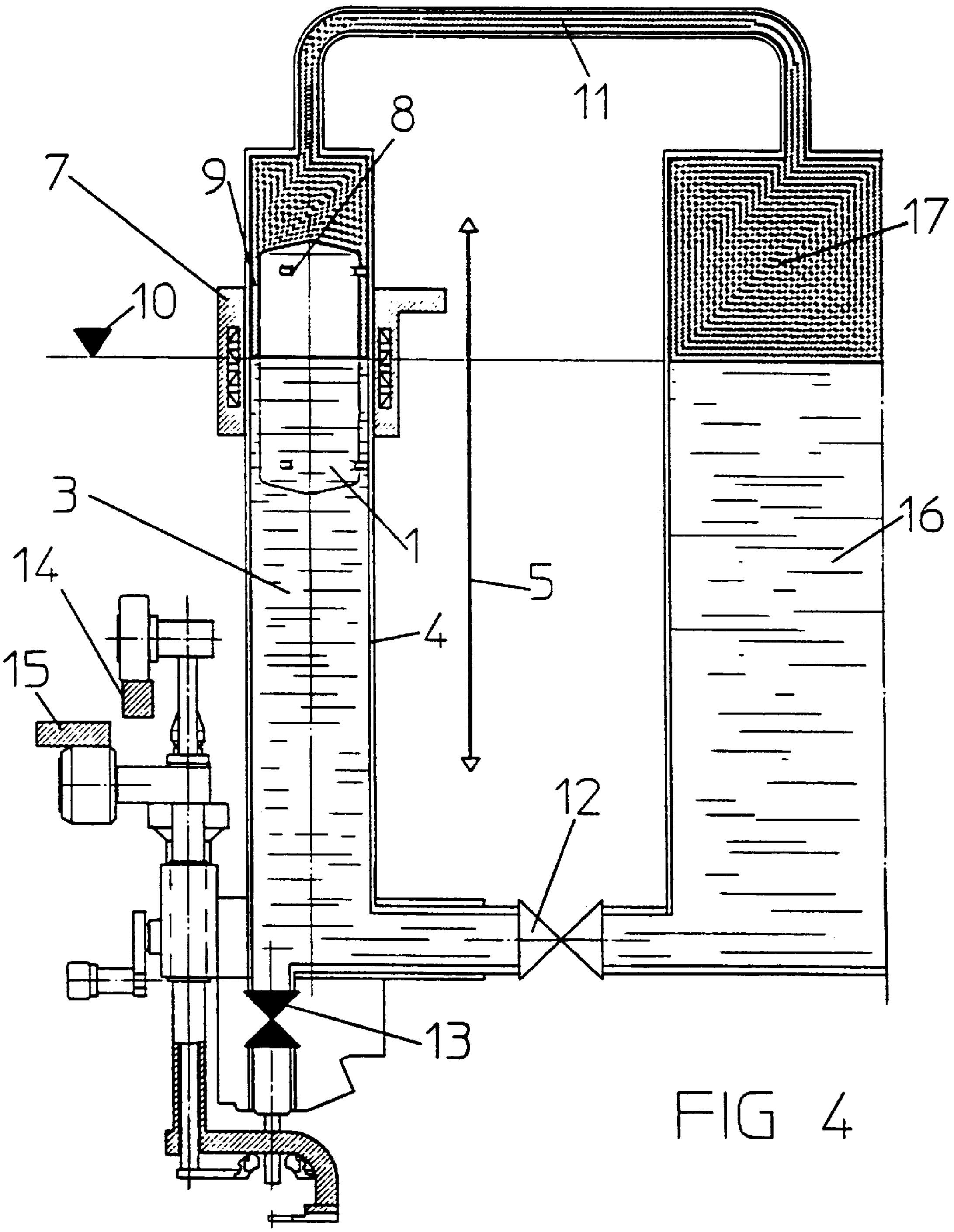
FIG. 4 is a view similar to FIGS. 1 to 3 showing the end of the transfer cycle.

FIG. 4 shows the end of the transfer cycle, when the liquid inside the volumetric chamber (3) has reached the level (10) of the main tank.

Figure 5:
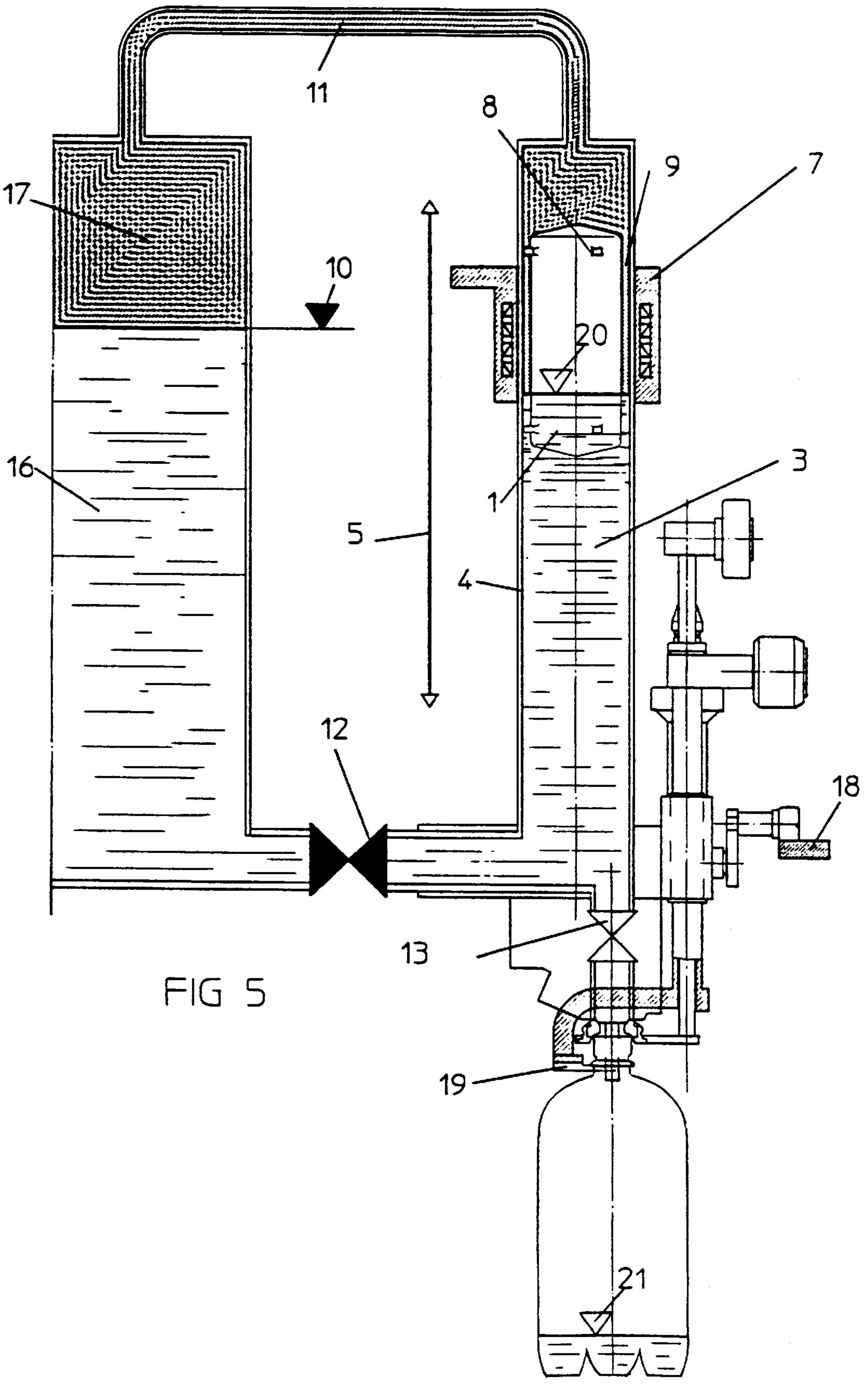
FIG. 5 is a view similar to FIGS. 1 to 4 illustrating the start of a delivery cycle in which liquid in the volumetric chamber is transferred to a bottle.

FIG. 5 shows the starting of the delivery phase from the volumetric chamber and the filling of the bottle.

Figure 6:
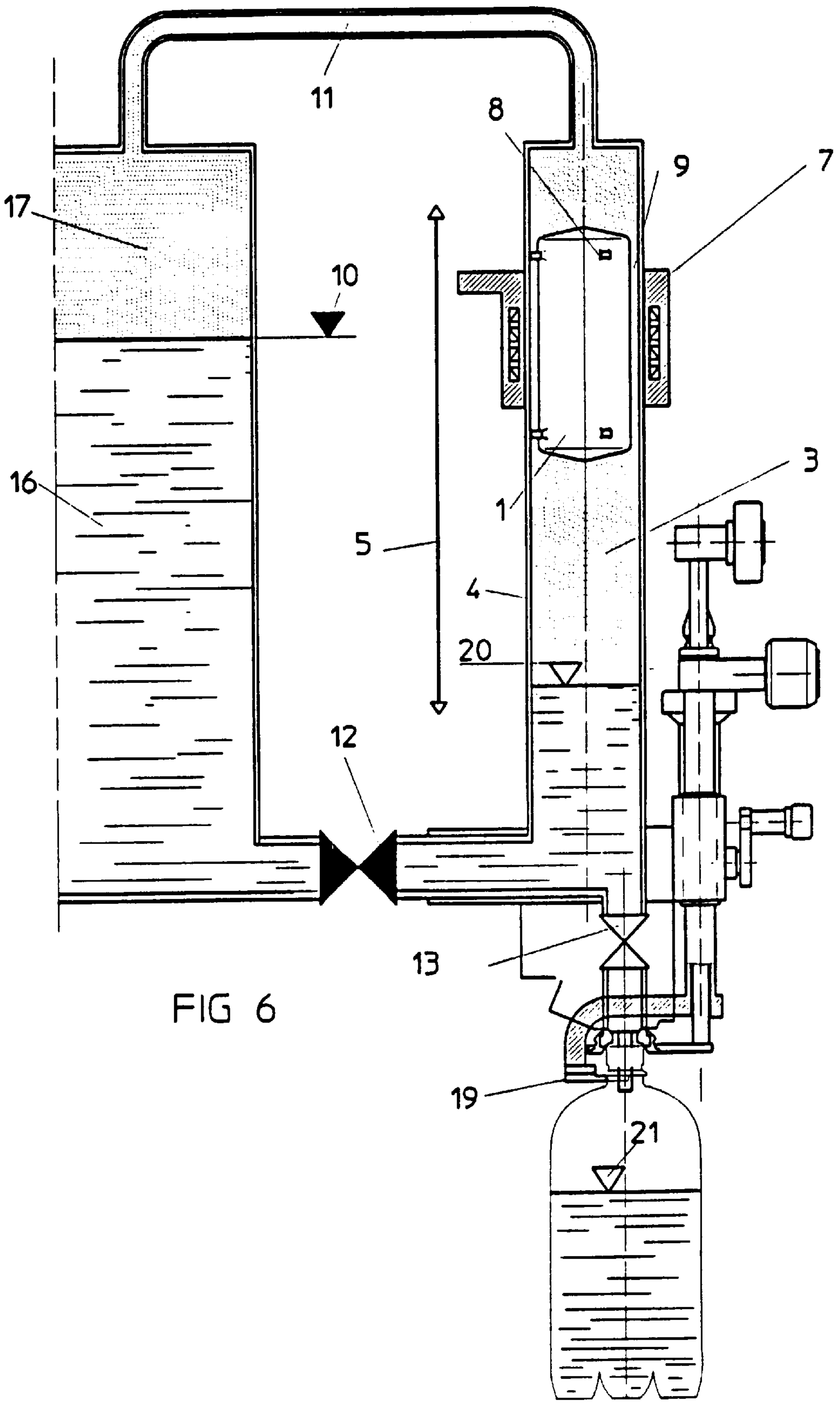
FIG. 6 is a view similar to FIG. 5 illustrating the continuing of the delivery cycle.

FIG. 6 shows the continuation of filling.

Figure 7:
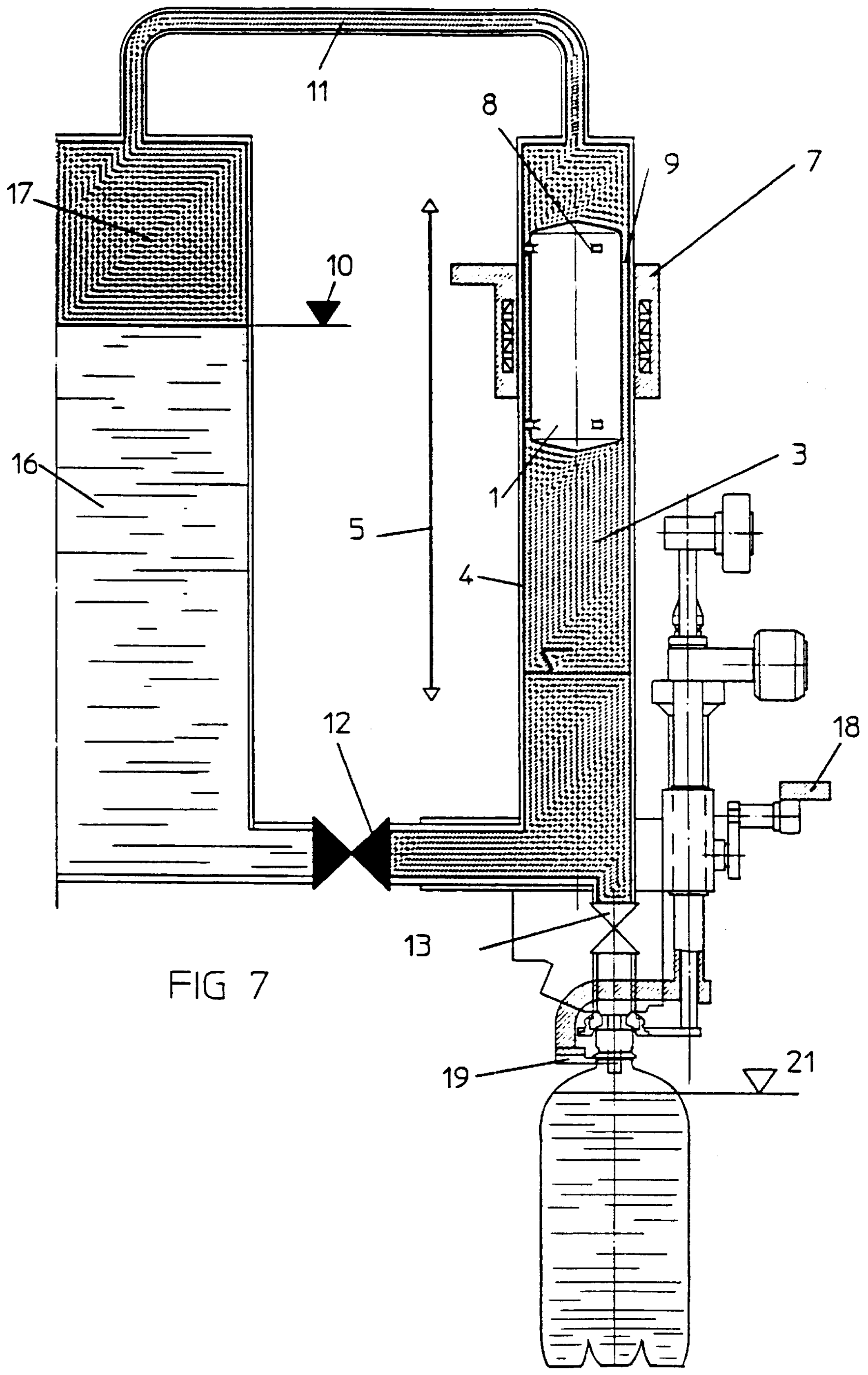
FIG. 7 is a view similar to FIGS. 5 and 6 illustrating the completion of the delivery cycle in which the bottle is filled.

FIG. 7 shows the completed phase of filling.

In the FIG. 5. FIG. 6 and FIG. 7 it is also shown the presence of gas (17)—for example carbon dioxide—in the main feeding tank (16) and in the volumetric chamber (3).

Figure 8:
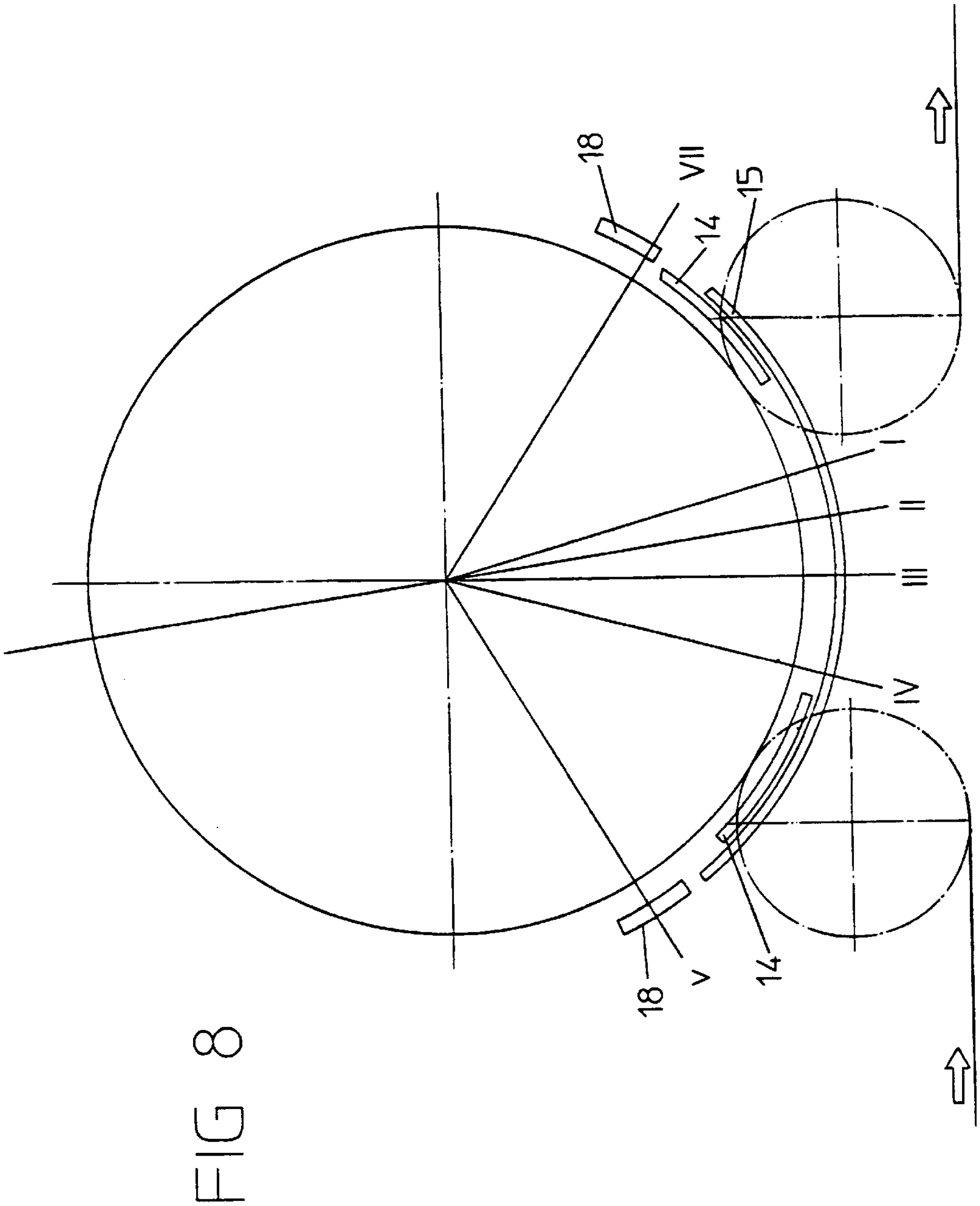
FIG. 8 is a schematic top view of a rotating filler assembly.

FIG. 8 shows a schematic top view of a rotating filler indicating the several phases of the technological processing of filling. Please note that the phases indicated I,II,III,IV,V, VI, and VII. relate to the FIGS. 1,2,3,4,5,6 and 7.

Figure 9:
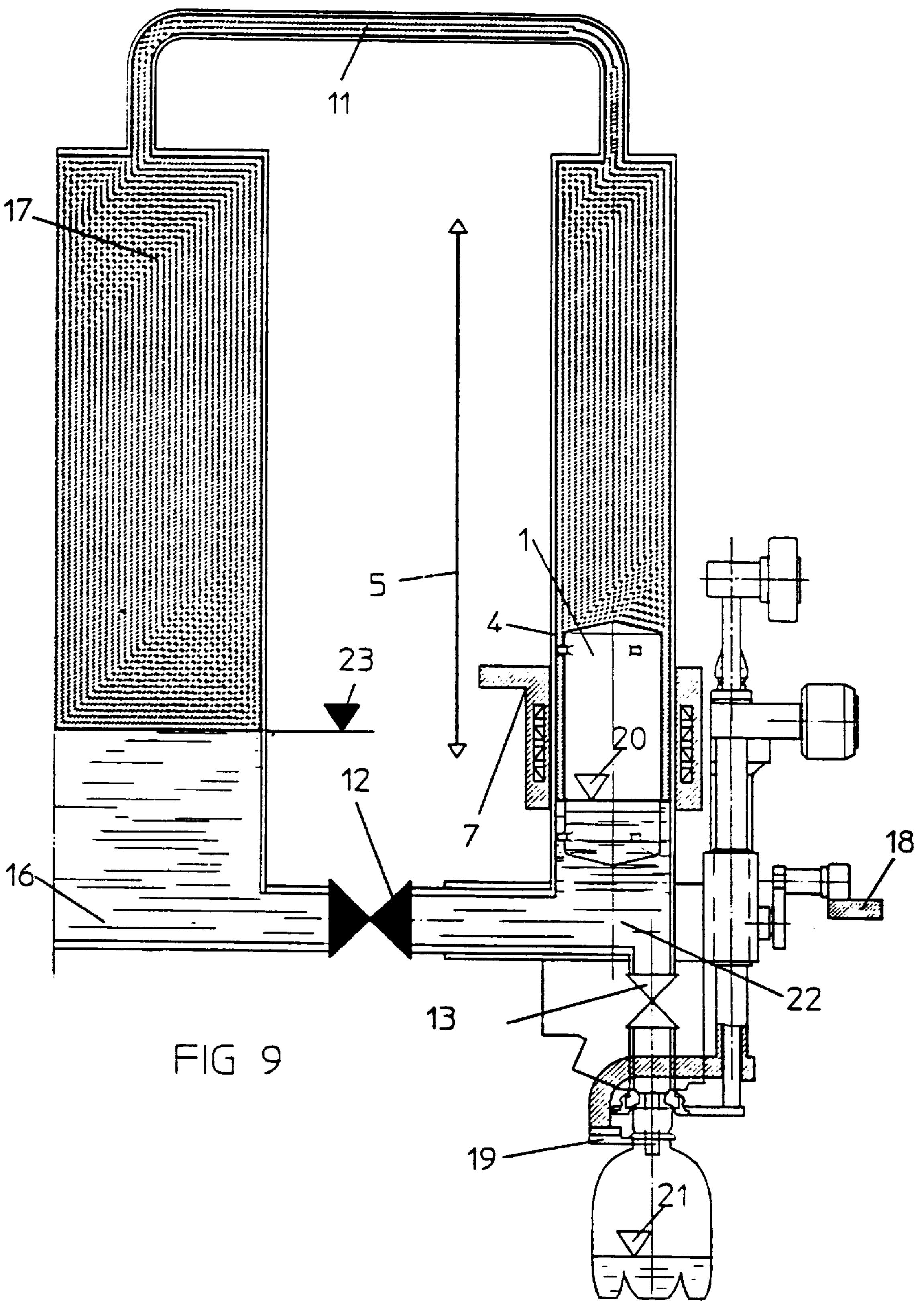
FIG. 9 is a view similar to FIG. 4 illustrating the end of a delivery cycle for filling bottles of smaller capacity than those of FIGS. 5 to 7.

FIG. 9 shows the lowered level (23) of the liquid inside the main tank and the corresponding lowered position of the sliding body (1), when the filler is regulated to fill bottles of reduced capacity.

Figure 10:
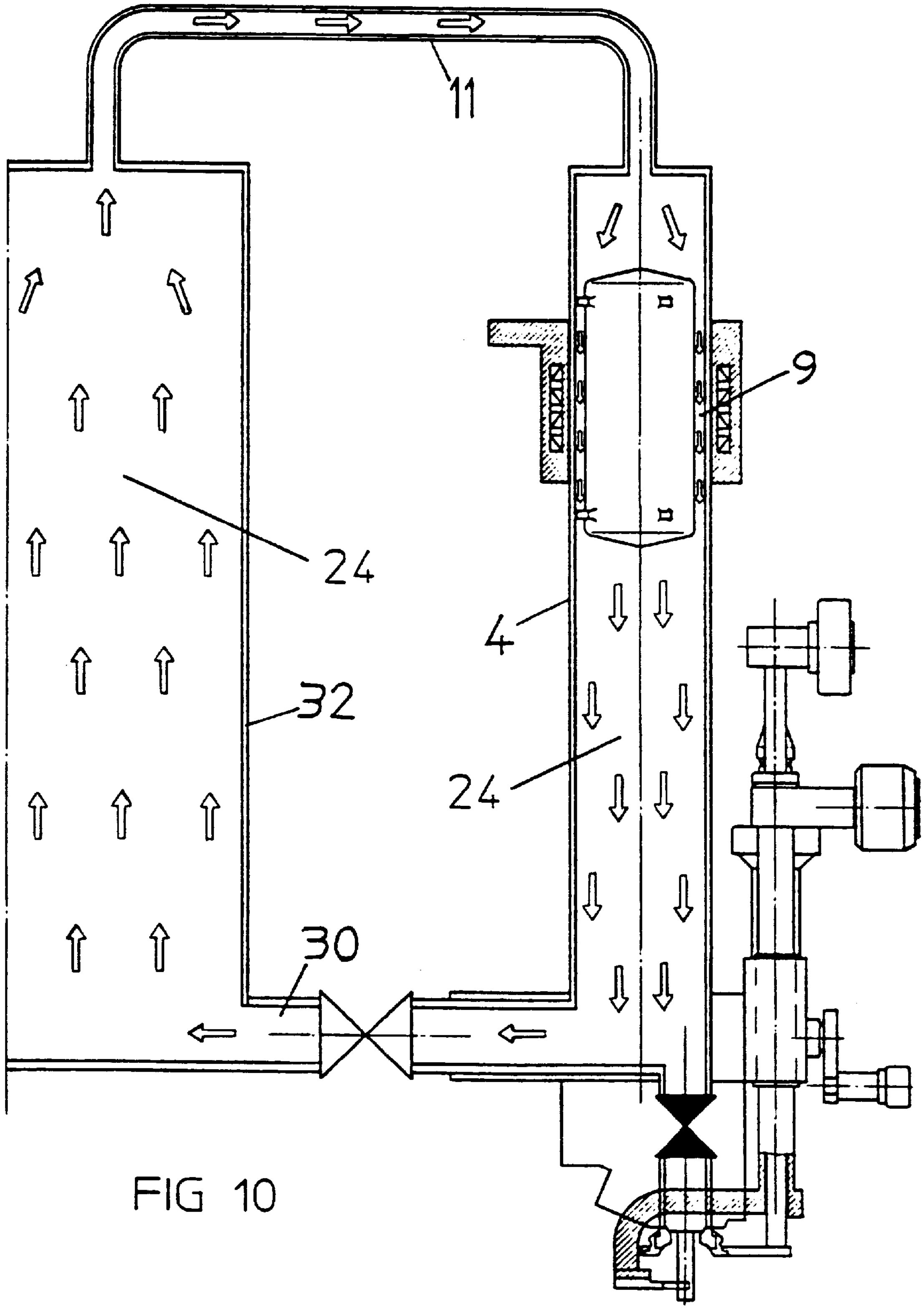
FIG. 10 is a partial cross-sectional view of the apparatus illustrating a cleaning operation.

FIG. 10 shows the operation for the sanitation of the filler and evidentiates how the absence of any o-rings facilitates the circulation of the cleaning liquid even in those critical interstices between cylinder and metering piston.

The arrows in FIG. 10 illustrate flow of the cleaning liquid from tank 32, through connecting pipe 11 and into the top of chamber 3, then down via the annular passageway 9 between device 1 and the inner wall of chamber 3 into the lower end of chamber 3, then back through passageway 30 into the tank 32. Thus, this arrangement permits full circulation of cleaning liquid through the entire apparatus, including the critical interstices, without the need for any venting tube or O-ring seals which make effective cleaning difficult.

In the figures every single detail is indicated as follows:

(1) shows a free-hanging device that can freely slide inside the volumetric chamber.

(2) shows north-magnetic rings incorporated in the device (1).

(2') shows south-magnetic rings incorporated in the device (1) but isolated from the north-magnetic ones.

(3) shows the volumetric chamber with a diameter bigger than the sliding device.

(4) shows the metering cylinder.

(5) shows the maximum axial internal movement of the free hanging device.

(6)and(6') show respectively north-magnets and south-magnets, incorporated on the external side of the sliding device (7).

(7) shows the external sliding device.

(8) show the centering shoes that guide the sliding movement of the free-hanging body (1) inside the volumetric chamber (3).

(9) shows the slack fit of the sliding body (1) and the inside wall of the volumetric chamber (3); said slack fit is not capillary and substitutes the traditional venting tube and facilitates the flow of the processing fluids to the volumetric chamber.

(10) show the constant level of the processing liquid inside the main feeding tank.

(11) shows a connecting pipe between the main feeding tank and the volumetric chamber.

(12) shows the cutoff valve of the processing liquid.

(13) shows the filling valve

(14) and (15) show the tappets for the lifting devices of the bottles.

(16) shows the processing liquid.

(17) shows the gas phase of the process.

(18) shows the tappet of the filling valve.

(19) shows the lifting devices of the bottles.

(20) shows the level of the liquid inside the volumetric chamber.

(21) shows the level of the liquid inside the bottle.

(22) shows the reduced capacity of the volumetric chamber.

(23) shows the reduced level of the processing liquid inside the main tank during the filling process of the bottles with a reduced capacity.

(24) show the operation of sanitation, during which the cleaning liquid flows easily, even through the critical interstices, between the sliding device (1) and the inside walls of the volumetric chamber (3).

(I), (II), (III) and (IV) in the FIG. 8 show the various phases of the process of transfer of the liquid from the main feeding tank to the volumetric chamber.

(V), (VI) and (VII) in the FIG. 8 show the various phases of the process of filling of the bottles.

The evidence of the drawings points out to the simplicity of the apparatus, which is without a venting valve and o-rings. It is also pointed out that the use of congruent magnets, which attract each other without contacting, allows to maneuver from the outside the movement of the device (1) inside the hermetic cylinder (4), guaranteeing the firm stability of the pre-set balancing positions corresponding to the various capacities of the bottles to be filled. It is also pointed out the fact that the annular shape or the central-symmetric positioning of the permanent magnets allows to nullify the resultant of the radial forces of magnetic attraction so to render nil the friction between the guide shoes (8) and the internal wall of the volumetric chamber (3).Said lack of friction optimizes the operations of axial positioning of the hanging device (1).

The invention is obviously susceptible to several variants of pratical realization as to what relates to the structural proportioning or the technological choices of the materials to be used.It is also evident that are to be considered as being a part of the present invention all those devices to regulate from the outside the capacity of the volumetric chamber of the metering devices of a filler without venting tube and without o-rings, and equipped with magnets, internal and external, to actuate the movements of the internal piston of a cylindrical volumetric chamber.

What is claimed is:

1. A metering apparatus for supplying predetermined quantities of liquid, comprising:

a vertically oriented metering cylinder having an inner wall defining a volumetric chamber;

a free-hanging metering device slidably mounted for axial movement within the volumetric chamber, the metering device having a first set of permanent magnets incorporated therein; and an external cursor device slidably mounted on the outside of the volumetric chamber, the cursor device having a second set of permanent magnets for attracting the first set of permanent magnets on the free-hanging metering device for holding the metering device in a selected position in the volumetric chamber, whereby the metering device may be moved axially to a new position in order to vary the amount of liquid supplied from the volumetric chamber by moving the external cursor device along the outside of the metering cylinder to a new predetermined position.

2. The apparatus as claimed in claim 1, wherein the metering device has an outer peripheral surface spaced from the inner wall of the chamber, and spaced shoes extending radially outwardly from the peripheral surface for guiding and centering the metering device for axial sliding movement within the chamber on sliding of the external cursor device.

3. The apparatus as claimed in claim 1, wherein the metering device is spaced from the inner wall of the metering cylinder to define an annular gap between the chamber wall and metering device, whereby fluids may be transferred between regions of the chamber on opposite sides of the metering device via the annular gap.

4. The apparatus as claimed in claim 2, wherein the metering device is spaced from the inner wall of the chamber to define an annular gap between the chamber wall and metering device, whereby fluids may be transferred between regions of the chamber on opposite sides of the metering device via the annular gap.

5. The apparatus as claimed in any one of claims 1 to 4, wherein each magnet of the first and second sets is of annular shape.

6. The apparatus as claimed in claim 1, wherein the volumetric chamber has no externally venting tubes.

* * * * *